United States Patent

Howe

(10) Patent No.: US 10,832,176 B2
(45) Date of Patent: Nov. 10, 2020

(54) CARDHOLDER TRAVEL DETECTION WITH INTERNET SERVICE

(71) Applicant: MasterCard International Incorporated, Purchase, NY (US)

(72) Inventor: Justin Xavier Howe, San Francisco, CA (US)

(73) Assignee: Mastercard International Incorporated, Purchase, NY (US)

( * ) Notice: Subject to any disclaimer, the term of this patent is extended or adjusted under 35 U.S.C. 154(b) by 788 days.

(21) Appl. No.: 14/563,148

(22) Filed: Dec. 8, 2014

(65) Prior Publication Data

US 2016/0162810 A1    Jun. 9, 2016

(51) Int. Cl.
- *G06Q 10/02* (2012.01)
- *G06Q 50/14* (2012.01)
- *G06Q 20/40* (2012.01)

(52) U.S. Cl.
CPC ............ *G06Q 10/02* (2013.01); *G06Q 20/40* (2013.01); *G06Q 20/4016* (2013.01); *G06Q 50/14* (2013.01)

(58) Field of Classification Search
CPC ........ G06Q 10/02; G06Q 50/14; G06Q 20/40; G06Q 20/4016
USPC .......................................................... 705/5
See application file for complete search history.

(56) References Cited

U.S. PATENT DOCUMENTS

| | | |
|---|---|---|
| 5,384,449 A | 1/1995 | Peirce |
| 5,478,993 A | 12/1995 | Derksen |
| 5,732,400 A | 3/1998 | Mandler et al. |
| 5,774,670 A | 6/1998 | Montulli |
| 5,819,226 A | 10/1998 | Gopinathan et al. |
| 6,035,285 A | 3/2000 | Schlect et al. |
| 6,924,739 B1 | 8/2005 | Infosino |
| 6,926,203 B1 | 8/2005 | Sehr |
| 6,963,740 B1 | 11/2005 | Guthery et al. |
| 7,203,665 B2 | 4/2007 | Donner |
| 7,653,599 B2 | 1/2010 | Doran et al. |
| 8,478,638 B2 | 7/2013 | Postrel |
| 8,620,780 B2 | 12/2013 | Krakowiecki et al. |
| 8,666,841 B1 * | 3/2014 | Claridge ............ G06Q 20/4016 705/26.35 |
| 8,983,868 B1 * | 3/2015 | Sehrer ................ G06Q 20/3224 705/1.1 |
| 9,489,680 B2 | 11/2016 | Baker et al. |

(Continued)

FOREIGN PATENT DOCUMENTS

| | | |
|---|---|---|
| EP | 2482244 A2 | 8/2012 |
| WO | WO-03/034633 A2 | 4/2003 |
| WO | WO-2013/078541 A1 | 6/2013 |

OTHER PUBLICATIONS

OMA develops key payment applications. Apr. 8, 2013, SyndiGate Media Inc, TradeArabia. p. 1. (Year: 2013).*

(Continued)

*Primary Examiner* — George Chen
*Assistant Examiner* — Hunter A Molnar
(74) *Attorney, Agent, or Firm* — Ballard Spahr LLP

(57) ABSTRACT

A system, method, and computer-readable storage medium configured to identify travel by payment cardholders using an internet service, and more particularly to reduce fraudulent transactions involving payment cards by generating a white list for travel associated with a payment cardholder.

20 Claims, 4 Drawing Sheets

(56) References Cited

U.S. PATENT DOCUMENTS

| | | |
|---|---|---|
| 2002/0051521 A1 | 5/2002 | Patrick |
| 2002/0100803 A1 | 8/2002 | Sehr |
| 2002/0139837 A1 | 10/2002 | Spitz et al. |
| 2002/0173996 A1 | 11/2002 | Murch et al. |
| 2003/0078850 A1 | 4/2003 | Hartman et al. |
| 2003/0182052 A1 | 9/2003 | DeLorme et al. |
| 2003/0200135 A1 | 10/2003 | Wright |
| 2004/0034570 A1 | 2/2004 | Davis |
| 2004/0050928 A1 | 3/2004 | Bishop et al. |
| 2004/0064405 A1 | 4/2004 | Weichert et al. |
| 2004/0125137 A1 | 7/2004 | Stata et al. |
| 2004/0203860 A1 | 10/2004 | Fellenstein et al. |
| 2005/0097051 A1 | 5/2005 | Madill et al. |
| 2005/0107997 A1 | 5/2005 | Watts et al. |
| 2006/0010101 A1 | 1/2006 | Suzuki et al. |
| 2006/0085308 A1* | 4/2006 | Metzger .............. G06Q 10/087 705/34 |
| 2007/0094061 A1 | 4/2007 | Hu et al. |
| 2007/0118449 A1 | 5/2007 | De La Motte |
| 2007/0203732 A1 | 8/2007 | Griegel et al. |
| 2007/0203804 A1 | 8/2007 | Kargman |
| 2007/0294195 A1 | 12/2007 | Curry et al. |
| 2008/0281741 A1 | 11/2008 | Hyde |
| 2009/0081947 A1* | 3/2009 | Margis .............. H04B 7/18508 455/3.02 |
| 2009/0276305 A1 | 11/2009 | Clopp |
| 2009/0276318 A1 | 11/2009 | Broadbent et al. |
| 2009/0287768 A1 | 11/2009 | Tanaka |
| 2010/0023455 A1* | 1/2010 | Dispensa .............. G06Q 10/02 705/44 |
| 2010/0070376 A1* | 3/2010 | Proud .................. G06Q 20/20 705/21 |
| 2010/0076829 A1 | 3/2010 | Bishop |
| 2010/0241535 A1 | 9/2010 | Nightengale et al. |
| 2010/0274649 A1 | 10/2010 | Smith |
| 2010/0299211 A1 | 11/2010 | Wu |
| 2010/0299716 A1 | 11/2010 | Rouskov et al. |
| 2010/0301114 A1 | 12/2010 | Lo Faro et al. |
| 2011/0071906 A1 | 3/2011 | Kamiyama et al. |
| 2011/0078021 A1 | 3/2011 | Tullis |
| 2011/0087591 A1 | 4/2011 | Barnett et al. |
| 2011/0208601 A1* | 8/2011 | Ferguson .............. G06Q 20/18 705/16 |
| 2011/0295711 A1 | 12/2011 | Mazmanyan |
| 2011/0302011 A1 | 12/2011 | Yoder et al. |
| 2012/0065800 A1 | 3/2012 | Baba et al. |
| 2012/0089641 A1* | 4/2012 | Wilde .............. G06F 17/30643 707/771 |
| 2012/0124617 A1 | 5/2012 | Krishnamoorthy et al. |
| 2012/0232917 A1 | 9/2012 | Al-Khudairy et al. |
| 2012/0244885 A1 | 9/2012 | Hefetz |
| 2013/0006823 A1* | 1/2013 | DePetro .............. G06Q 20/3224 705/35 |
| 2013/0006858 A1 | 1/2013 | DePetro |
| 2013/0018795 A1 | 1/2013 | Kolhatkar et al. |
| 2013/0024242 A1 | 1/2013 | Villars et al. |
| 2013/0046717 A1 | 2/2013 | Grigg et al. |
| 2013/0103217 A1 | 4/2013 | Tadano |
| 2013/0110833 A1 | 5/2013 | Fredericks et al. |
| 2013/0268318 A1 | 10/2013 | Richard |
| 2013/0282581 A1 | 10/2013 | Singh |
| 2013/0310996 A1 | 11/2013 | Boss et al. |
| 2014/0025410 A1 | 1/2014 | Churchman et al. |
| 2014/0058815 A1 | 2/2014 | Hiremath et al. |
| 2014/0337062 A1 | 11/2014 | Howe |
| 2015/0012430 A1 | 1/2015 | Chisholm et al. |
| 2015/0012434 A1* | 1/2015 | Aabye .............. G06Q 20/027 705/44 |
| 2015/0026070 A1 | 1/2015 | Groarke et al. |
| 2015/0046220 A1 | 2/2015 | Gerard et al. |
| 2015/0046302 A1 | 2/2015 | Hu et al. |
| 2015/0057837 A1 | 2/2015 | Moore, Jr. |
| 2015/0006529 A1 | 3/2015 | Suto et al. |
| 2015/0081362 A1 | 3/2015 | Chadwick et al. |
| 2015/0088752 A1 | 3/2015 | Howe |
| 2015/0101062 A1 | 4/2015 | Silver et al. |
| 2015/0142665 A1 | 5/2015 | Dicker et al. |
| 2015/0161610 A1 | 6/2015 | Sahadevan et al. |
| 2015/0170135 A1 | 6/2015 | Fourez |
| 2015/0178733 A1* | 6/2015 | Kozloski ............ G06Q 20/4016 705/44 |
| 2015/0317613 A1 | 11/2015 | Clark |

OTHER PUBLICATIONS

International Search Report and Written Opinion dated Dec. 22, 2015 for Application No. PCT/US2015/051859, which was filed on Sep. 24, 2015 and published as WO2016/049271 on Mar. 31, 2016 (Inventor—Howe et al; Applicant—MasterCard International, Inc.) (9 Pages).

Non-Final Office Action dated Oct. 22, 2014 for U.S. Appl. No. 13/956,161, filed Jul. 31, 2013 and published as U.S. 2014/0337217 on Nov. 13, 2014 (Inventor—Howe; Applicant—Mastercard International Incorporated) (13 Pages).

Non-Final Office Action dated Apr. 3, 2015 for U.S. Appl. No. 13/956,161, filed Jul. 31, 2013 and published as U.S. 2014/0337217 on Nov. 13, 2014 (Inventor—Howe; Applicant—Mastercard International Incorporated) (18 Pages).

Non-Final Office Action dated Dec. 31, 2014 for U.S. Appl. No. 13/963,284, filed Aug. 9, 2013 and published on Feb. 12, 2015 as 2015-0046302 (Applicant—MasterCard International, Inc. // Inventor—Hu, et al.) (8 pages).

Response to Non-Final Office Action filed in Mar. 31, 2015 for U.S. Appl. No. 13/963,284, filed Aug. 9, 2013 and published on Feb. 12, 2015 as 2015-0046302 (Applicant—MasterCard International, Inc. // Inventor—Hu, et al.) (11 pages).

Final Office Action dated Apr. 16, 2014 for U.S. Appl. No. 13/963,284, filed Aug. 9, 2013 and published on Feb. 12, 2015 as 2015-0046302 (Applicant—MasterCard International, Inc. // Inventor—Hu, et al.) (13 pages).

Non-Final Office Action dated May 11, 2015 for U.S. Appl. No. 14/183,220, filed Feb. 18, 2014 (Applicant—MasterCard International, Inc. // Inventor—Unser, et al.) (17 pages).

Non-Final Office Action dated May 6, 2015 for U.S. Appl. No. 14/591,714, filed Jan. 7, 2015 (Applicant—MasterCard International, Inc. // Inventor—Howe, et al.) (10 pages).

International Search Report and Written Opinion dated Nov. 11, 2016 by the International Searching Authority for Patent Application No. PCT/US2016/047302, which was filed on Aug. 17, 2016 and published as WO 2017/031181 on Feb. 23, 2017 (Inventor—Howe et al.; Applicant—Mastercard International, Inc.) (8 pages).

International Preliminary Report on Patentability dated Feb. 20, 2018 by the International Searching Authority for Patent Application No. PCT/US2016/047302, which was filed on Aug. 17, 2016 and published as WO 2017/031181 on Feb. 23, 2017 (Inventor—Howe et al.; Applicant—Mastercard International, Inc.) (6 pages).

Final Rejection dated Jul. 29, 2019 by the USPTO for U.S. Appl. No. 14/831,756, filed Aug. 20, 2015 and published as US 2017/0053281 A1 on Feb. 23, 2017 (Inventor—Justin Howe) (33 Pages).

\* cited by examiner

CARDHOLDER TRAVEL DETECTION WITH INTERNET SERVICE

BACKGROUND

Field of the Disclosure

Aspects of the disclosure relate in general to financial services. Aspects include a method and a decision-making platform to identify travel by payment cardholders using an internet service, and more particularly to reduce fraudulent transactions involving payment cards.

Description of the Related Art

A payment card is a card that can be used by a cardholder and accepted by a merchant to make a cashless or non-cash payment for a purchase or in payment of some other obligation. Payment cards include credit cards, debit cards, charge cards, and Automated Teller Machine (ATM) cards. Payment cards provide the clients of a financial institution ("cardholders") with the ability to pay for goods and services without the inconvenience of using cash.

The payment industry suffers from problems stemming from inflight travel by cardholders. One problem is that fraud rates in inflight transactions (in which the cardholder is from a different country than a merchant) are much higher than those experienced on domestic transactions. These high fraud rates make it risky for the card issuing financial institution ("issuers") to approve inflight transactions. As a result, issuers often attempt to mitigate the risk by declining inflight transactions at higher rates than domestic transactions. While these higher decline rates may minimize the issuing bank's fraud exposure, it inconveniences the cardholder, deprives the merchant of a sale, and deprives the issuer of incremental revenue on the purchase.

Generally, at least one payment card network currently provides fraud scoring for payment card transactions. Fraud scoring refers to an indication, or likelihood, that a payment transaction is fraudulent. In one fraud scoring system, the payment card network provides a number back to the payment card issuer between zero and 999. To provide fraud scoring capability, various vendors or payment card companies provide and market various different fraud scoring products. A payment card company generally selects one of the vendor products to provide its customers (the card issuers) with one of fraud scoring and credit risk scoring that is accessible, for example, on an payment card network.

SUMMARY

Embodiments include a system, device, method and computer-readable medium to identify travel by payment cardholders using an internet service, and more particularly, to reduce fraudulent transactions involving payment cards by generating a white list for travel associated with a payment cardholder.

A system embodiment includes a network interface, a processor, and a non-transitory computer-readable medium. The network interface is configured to receive transaction data from an inflight internet service provider. The transaction data includes a primary account number (PAN) associated with the cardholder, a cardholder name and addenda for the transaction data. The processor extracts travel information from the addenda. The travel information includes a flight number. The processor matches a present travel date and the flight number with an entry in a travel database. The entry in the travel database includes a flight destination location. The non-transitory computer-readable medium is configured to store, in a white list database, a white list entry associated with the primary account number. The white list entry contains a date of travel and an anticipated travel location based on the flight destination location.

DETAILED DESCRIPTION

One aspect of the disclosure includes the realization that anticipated cardholder travel data may be incorporated as a factor to vendor fraud scoring products in the authorization of transactions. In particular embodiments of the disclosure detect cardholder use of an internet service to anticipate cardholder travel. In such a system, the payment card network combines the cardholder travel into a travel database.

While embodiments described herein are applied to an inflight context, it is understood by those familiar with the art that the concepts, apparatus, system and methods described herein may also be applicable to domestic travel that is far from a cardholder's usual area of residence.

In an alternate embodiment, a travel-rules based engine may be used in addition to score-based fraud detector.

The systems and processes are not limited to the specific embodiments described herein. In addition, components of each system and each process can be practiced independently and separately from other components and processes described herein. Each component and process also can be used in combination with other assembly packages and processes.

Figure 1:
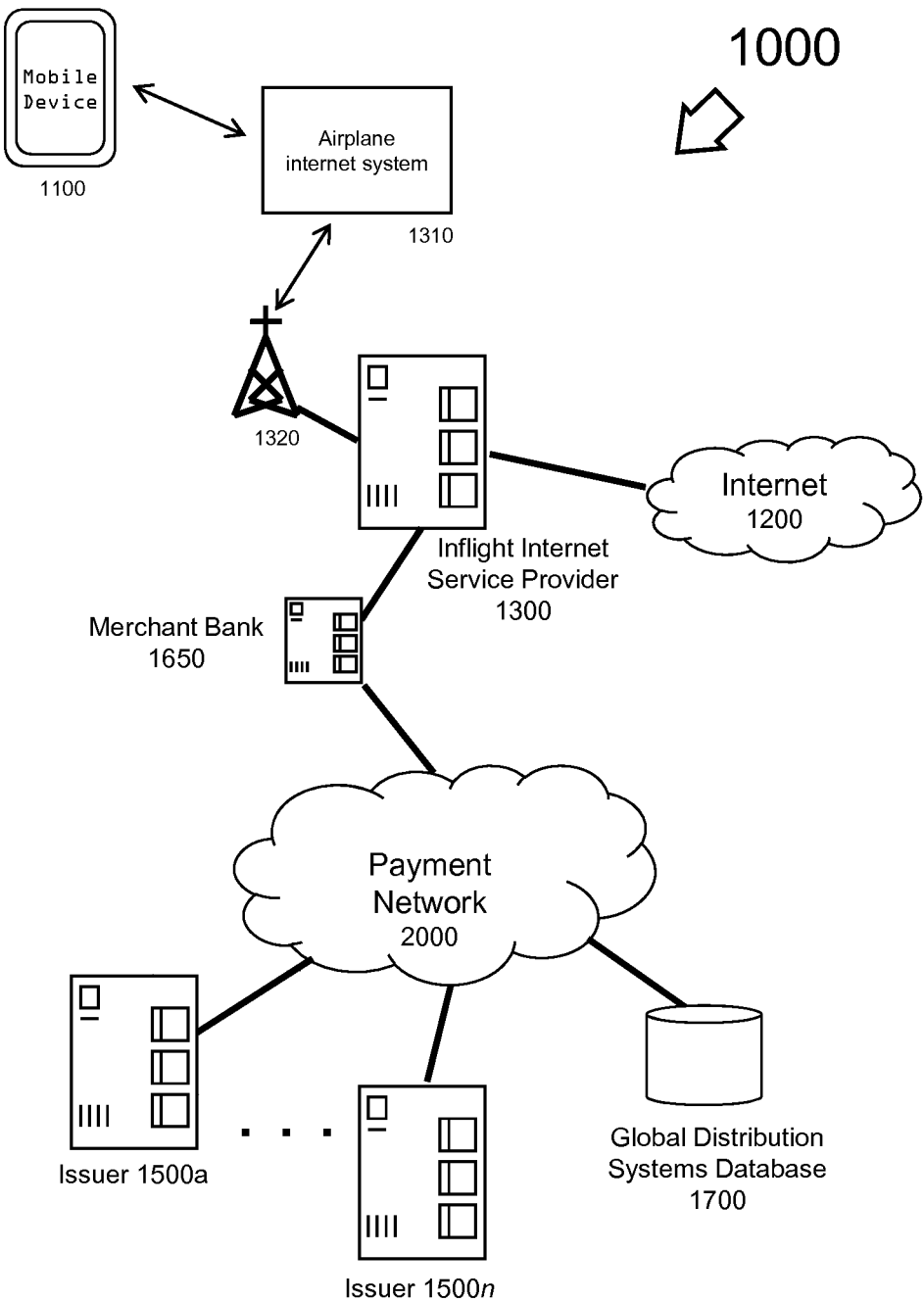
FIG. 1 is a block diagram illustrating a system to detect cardholder travel through a cardholder using an airplane internet service.

FIG. 1 is a block diagram 1000 illustrating detection of cardholder use of an airplane internet system. The present disclosure is related to a payment card payment system, such as a payment system using the MasterCard® interchange, Cirrus® network, or Maestro®. The MasterCard interchange is a proprietary communications standard promulgated by MasterCard International Incorporated for the exchange of financial transaction data between financial institutions that are customers of MasterCard International Incorporated. Cirrus is a worldwide payment network 2000 operated by MasterCard International Incorporated linking debit and payment cards to a network of ATMs throughout the world. Maestro is a multi-national debit card service owned by MasterCard International Incorporated.

In a financial payment system, a financial institution called the "issuer" 1500 issues a payment card to a consumer, who uses the payment card to tender payment for internet service on an airplane (at airplane internet system 1310). In addition to payment cards, it is understood by those familiar with the art that the process herein applies equally to mobile device (such as key fobs, mobile phones, tablet computers, and the like), such as mobile device 1100, electronic wallets, or computers, connected to inflight internet service provider 1300 via a wireless network 1320. Inflight internet service provider 1300 provides access to the Internet 1200.

In this example, a user presents the payment card to airplane internet system 1310, which is part of the inflight internet service provider 1300. The inflight internet service provider 1300 is affiliated with a financial institution. This financial institution is usually called the "merchant bank" or the "acquiring bank" or "acquirer bank" 1650. When a payment card, such as a mobile device 1100 is tendered at the inflight internet service provider 1300, the inflight internet service provider 1300 electronically contacts merchant bank 1650 with the cardholder's Primary Account Number (PAN) and the amount of the purchase. Assuming the payment card is in the form of a physical payment card, the request is performed electronically with the consumer's account information from the magnetic stripe on the payment card or via a computer chip imbedded within the card, or this information can be extracted from a picture of the card face. The account information is forwarded to transaction processing computers of the merchant bank 1650. Alternatively, a merchant bank 1650 may authorize a third party to perform transaction processing on its behalf. In this case, the inflight internet service provider 1300 will be configured to communicate with the third party. Such a third party is usually called a "merchant processor" or an "acquiring processor."

Using a payment network 2000, the computers of the merchant bank 1650 or the merchant processor will communicate via an payment network 2000 with the computers of the issuer bank 1500 to determine whether the consumer's account is in good standing and whether the inflight transaction is likely to be fraudulent. As part of the fraud determination, payment network 2000 may utilize anticipated travel information that has been corrected by a Global Distribution Systems (GDS) database. A Global Distribution System is a network that enables automated transactions between third parties and booking agents in order to provide travel-related services to end consumers. A GDS can link services, rates and bookings consolidating products and services across airline reservations, hotel reservations, car rentals and activities. Based on these determinations, the request for authorization will be declined or accepted. If the request is accepted, an authorization code is issued to the inflight internet service provider 1300.

When a request for authorization is accepted, the available credit balance of cardholder's account is decreased.

After a transaction is captured, the transaction is settled between the inflight internet service provider 1300, the merchant bank 1650, and the issuer 1500. As described herein, the term "payment card" includes cards such as credit cards, charge cards, and debit cards, but also includes any other devices that may hold payment account information, such as mobile phones, personal digital assistants (PDAs), and key fobs.

In embodiments of the current disclosure, payment network 2000 is able to preemptively reject inflight transactions based on rules, without seeking authorization from the issuer bank 1500. As will be described below, these rules may eliminate potential fraudulent transactions from occurring.

Figure 2:
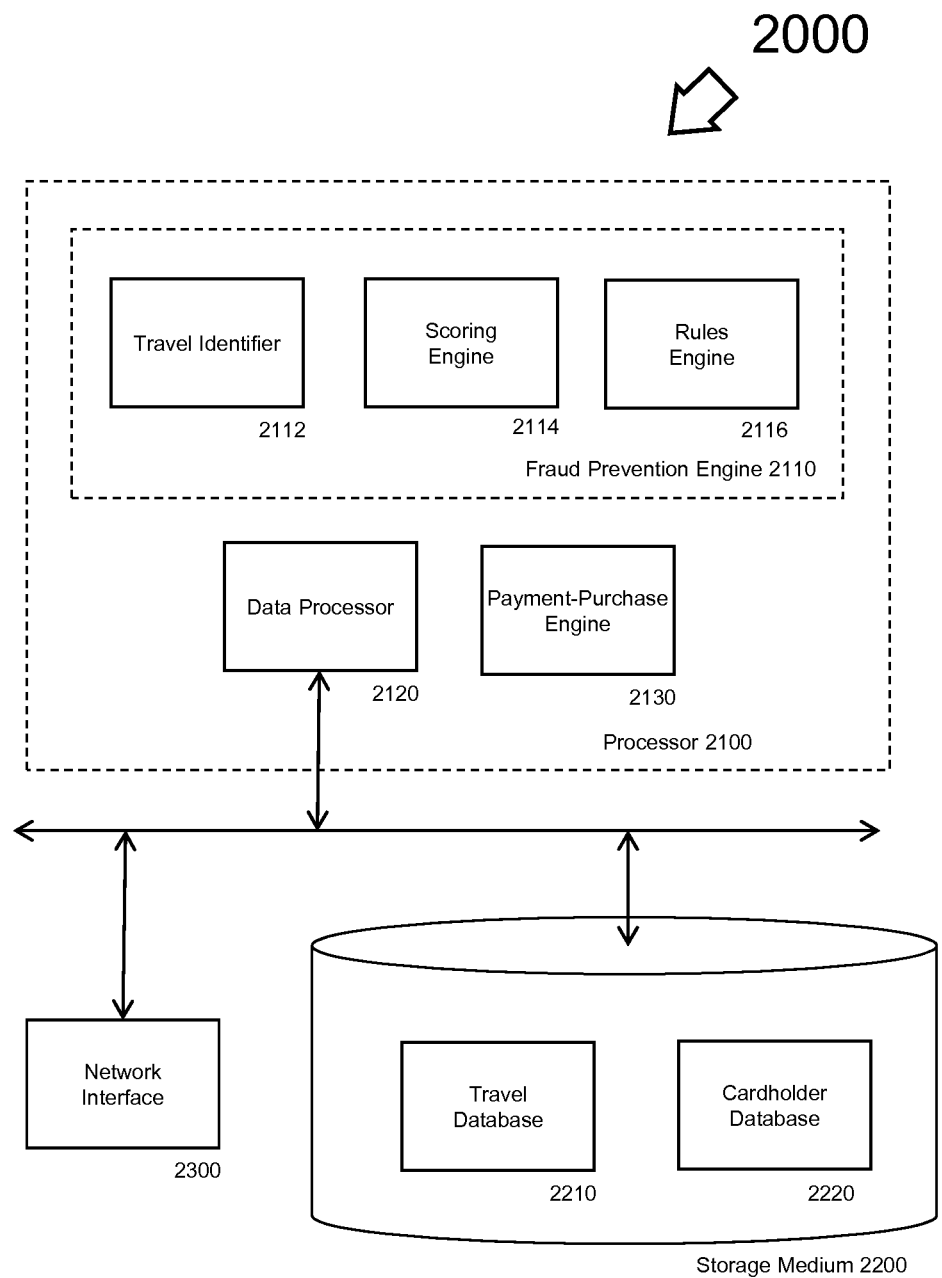
FIG. 2 is an expanded block diagram of an exemplary embodiment of a server architecture of a payment network embodiment configured to detect cardholder travel through a cardholder using an airplane internet service.

Embodiments will now be disclosed with reference to a block diagram of an exemplary payment network server 2000 of FIG. 2, configured to detect cardholder travel through a cardholder using an airplane internet service, constructed and operative in accordance with an embodiment of the present disclosure.

Payment network server 2000 may run a multi-tasking operating system (OS) and include at least one processor or central processing unit (CPU) 2100, a non-transitory computer-readable storage medium 2200, and a network interface 2300.

Processor 2100 may be any central processing unit, microprocessor, micro-controller, computational device or circuit known in the art.

As shown in FIG. 2, processor 2100 is functionally comprised of a fraud prevention scoring engine 2110, a payment-purchase engine 2130, and a data processor 2120.

Data processor 2120 interfaces with storage medium 2200 and network interface 2300. The data processor 2120 enables processor 2100 to locate data on, read data from, and writes data to, these components.

Payment-purchase engine 2130 performs payment and purchase transactions, and may do so in conjunction with fraud prevention scoring engine 2110.

Fraud prevention scoring engine 2110 is the structure that enables anti-fraud scoring or rules-based fraud-prevention of a financial transaction, and may further comprise: a travel identifier 2112, a scoring engine 2114 and/or a rules engine 2116.

Travel identifier 2112 analyzes the addenda of financial transactions to identify anticipated future travel. Note that the inflight internet service provider 1300 generally informs travel identifier 2112 of the cardholder's flight number and/or destination. The addenda may be used to identify a return travel date. In some embodiments, a cardholder may be auto-identified based on the Media Access Control (MAC) address of the mobile device after the first paid usage of the inflight internet service provider 1300. Scoring engine 2114 performs a back-end batch process to facilitate the on-line credit refund transaction. The functionality of both structures is elaborated in greater detail in FIGS. 3 and 4.

Fraud prevention scoring engine 2110 may store data related to cardholder payment credit, debit, or charge information in a cardholder database 2230.

These structures may be implemented as hardware, firmware, or software encoded on a computer readable medium, such as storage media 2200. Further details of these components are described with their relation to method embodiments below.

Computer-readable storage media 2200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. In some embodiments, computer-readable storage medium 2200 may be remotely located from processor 2100, and be connected to processor 2100 via a network such as a local area network (LAN), a wide area network (WAN), or the Internet.

In addition, as shown in FIG. 2, storage media 2200 may also contain a travel database 2210, and a cardholder database 2220. Travel database is a data structure configured to store airline flight schedule information, which may be received from a Global Distribution Systems database. A cardholder database 2220 is a database configured to store cardholder information, including a cardholder name and PAN associated with the cardholder. In some embodiments, cardholder database 2220 includes a white list of anticipated cardholder travel locations and dates.

Network interface 2300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 2300 allows payment network server 2000 to communicate with merchant 1100 and issuer 1200.

Figure 3:
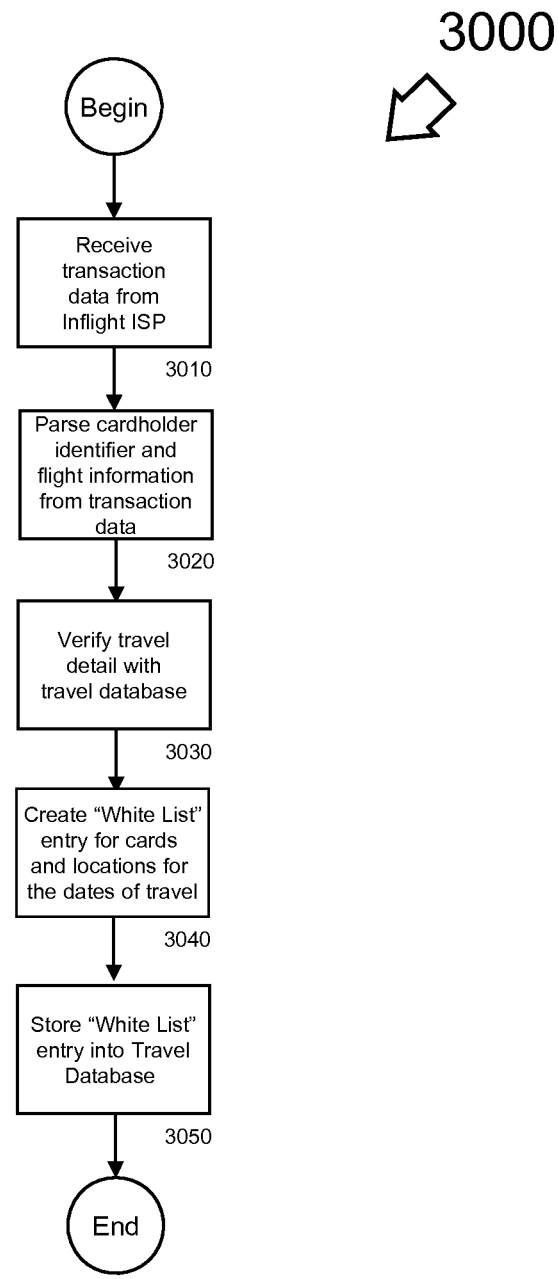
FIG. 3 illustrates a non-real time clearing process of white listing cardholder travel through detecting a cardholder using an airplane internet service.
Figure 4:
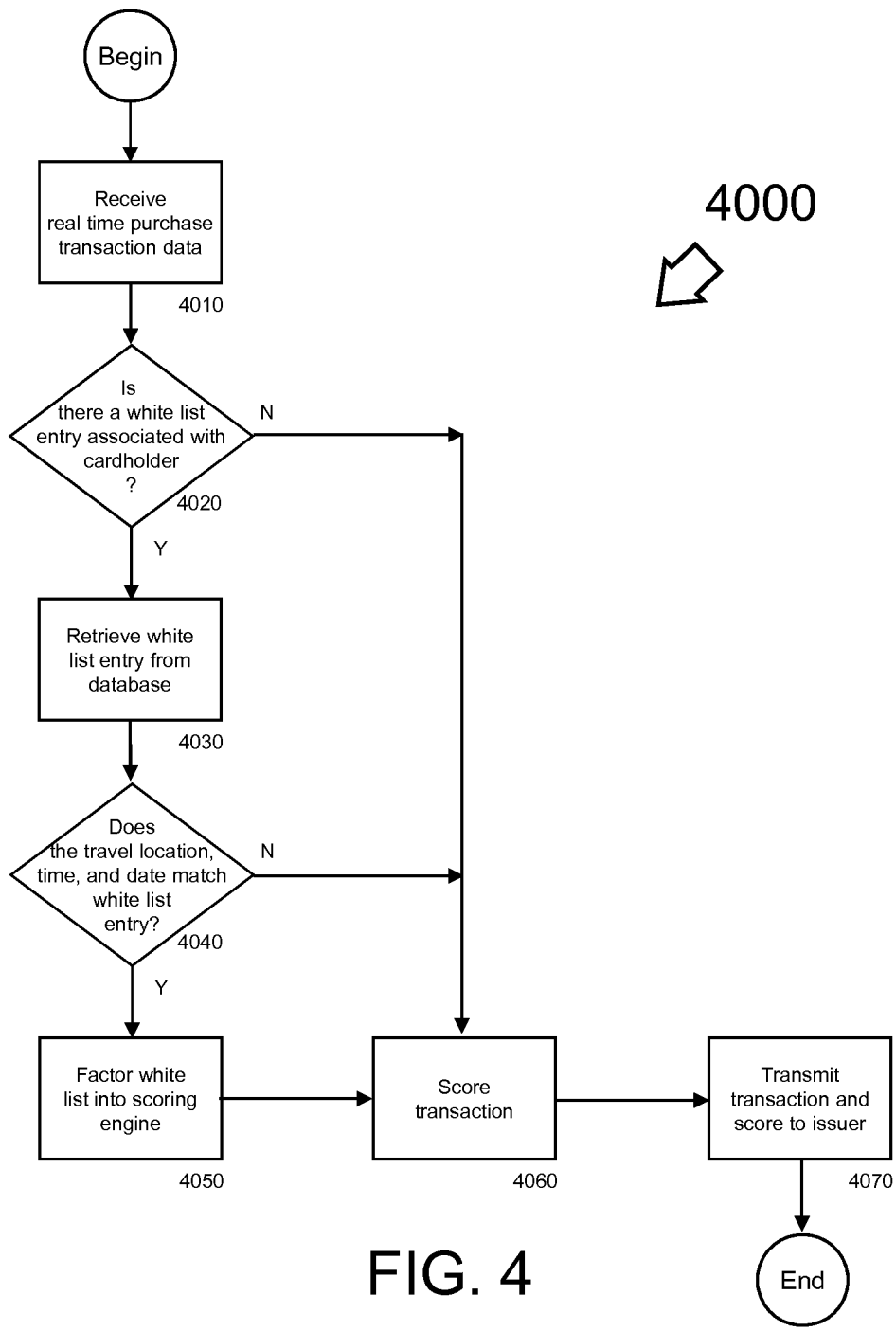
FIG. 4 illustrates an alternate (rules based) method of authorizing a inflight transaction.

We now turn our attention to method or process embodiments of the present disclosure, FIGS. 3-4. It is understood by those known in the art that instructions for such method embodiments may be stored on their respective computer-readable memory and executed by their respective processors. It is understood by those skilled in the art that other equivalent implementations can exist without departing from the spirit or claims of the disclosure.

Embodiments identify spending by a cardholder on an inflight internet service provider 1300 to anticipate cardholder travel to a destination, factoring the travel in future financial transaction processing.

FIG. 3 illustrates a process 3000 to white list cardholder travel through detecting a cardholder using an airplane internet service, constructed and operative in accordance with an embodiment of the present disclosure. It is understood by those familiar with the art that process 3000 may be a non-real time clearing process, but in alternate embodiments may be a real time process. Conventionally, a clearing process is a non-real time process.

At block 3010, payment network 2000 receives transaction data from an inflight internet service provider 1300. When cardholders use an inflight internet service provider 1300, by definition they are traveling, as they are using the service on an airplane.

The transaction data includes a cardholder identifier, a merchant identifier and a transaction amount. The cardholder identifier is an identifier associated with a cardholder account, such as a PAN. The merchant identifier identifies the merchant that is providing a good or service; in this instance, the merchant identifier identifies the inflight internet service provider 1300 as the merchant. The transaction amount is the amount being charged by the inflight internet service provider 1300. The transaction data is received electronically via a network interface 2300.

Additionally, in some embodiments, the transaction data includes addenda data. In such embodiments, the addenda information may also include the flight information associated with the flight being flown by the cardholder. The flight information may include an airline flight number, flight departure location, and flight destination location. Typically, flight departure locations and flight destination locations are indicated by a three-letter airport code.

In some instances, the inflight internet service provider 1300 may not know the flight number or destination. Some embodiments may address this situation by performing a geo-location pull, which is a positioning triangulation. The geo-location pull may be an origin geo-location pull or a destination geo-location pull. In such embodiments the origin is determined when the plane doors are closed (in case of an origin geo-location pull) or opened (in case of a destination geo-location pull).

At block 3020, the fraud prevention engine 2110 parses the cardholder identifier, and any flight information from the transaction data.

At block 3030, payment network 2000 determines whether the inflight internet service provider transaction has correctly provided traveler itinerary information encoded within addenda. The addenda messages may be populated by inflight internet service provider 1300 at the time payment for internet service is made. Such itinerary information may include the travel destination/departure points, and date of travel.

In some instances, the addenda are incomplete. In such instances, the travel itinerary information is verified against travel database 2210, block 3030. Such a database includes flight details, such as departure and destination locations, and additionally purchased travel by the cardholder. As part of the verification process, the addenda are corrected and travel details are added, if necessary. In some embodiments, travel database 2210 may be supplemented by information in a Global Distribution Systems database. Such supplemental information may include a cardholder travel itinerary which includes subsequent travel.

At block 3040, travel identifier 2112 creates a "white list" entry for the cardholder (and their associated PANs), including locations for the dates of travel. For example, if cardholder Karin purchases internet service from a flight from New York JFK airport to San Diego, Calif., then a white list is created for the PAN associated with Karin listing San Diego, Calif. as the destination. Also, as the inflight internet service is purchased, the payment network 2000 knows that the present date of travel is the authorization date. Additionally, using GDS data, Karin's return flight information may be determined as subsequent travel, and similarly stored in the white list entry. A travel timeframe can be determined as the difference between the date of the internet service travel authorization and the date of the subsequent travel. Consequently, a travel location and travel timeframe for the cardholder may be stored in the appropriate white list entry. In some embodiments, the white list entry may adjust or extrapolate location information to proximate locations, based on city, metropolitan area, county, state, province or country.

At block 3050, the created white list entries are stored into the cardholder database 2220.

It is understood that embodiments of the disclosure use the white list as a factor in scoring payment card financial transactions.

FIG. 4 illustrates a real-time method 4000 that factors anticipated travel in fraud detection and scoring, constructed and operative in accordance with an embodiment of the present disclosure.

At block 4010, payment network 2000 receives transaction request from a merchant bank. As mentioned above, the transaction request typically contains information such as the amount of the transaction and a PAN associated with the payment card, and the (location) origin of the transaction.

At block 4020, payment network 2000 determines whether the a white list entry is associated with the cardholder by checking travel database 2210. If not, flow continues at block 4060. If a white list entry is associated with the cardholder, flow continues at block 4030.

At block 4030, a white list entry is associated with the cardholder, and payment network 2000 retrieves the white list entry.

The transaction location, time and date are compared with the white list entry at block 4040 to determine if the travel location time, and date match the white list entry. Fraud prevention engine 2110 may automatically adjust the time and date for the time zone of the transaction origin. If the transaction does not fit within the white list entry, the process flow continues at block 4060.

If the transaction does fits within the time, date, and location information of the white list entry, the white list information is added as a factor for the scoring engine, block 4050.

The transaction is scored by scoring engine 2114 at block 4070, and the score is transmitted along with the transaction information to the issuer, block 4070. With this information, an issuer may decide whether to permit or reject the transaction. In some embodiments where the payment network 2000 is located at an issuer, the process authorizes or rejects the transaction directly. In yet other embodiments, payment network 2000 may preemptively reject the transaction without consultation with the issuer, if the score from the score transaction is too low.

It is understood by those familiar with the art that the system described herein may be implemented in hardware, firmware, or software encoded on a non-transitory computer-readable storage medium.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A method comprising:
    receiving, with a network interface, from an in-flight internet service provider, payment transaction data associated with a purchase of internet service from the in-flight internet service provider, wherein the payment transaction data comprises a primary account number (PAN) associated with a cardholder, a cardholder name associated with the cardholder, a transaction date, and payment addenda;
    determining, with a processor, a flight number based on the payment addenda and a flight destination based on the flight number, the transaction date, and an entry in a travel database associated with the flight number and the transaction date;
    generating, with the processor in response to receiving the payment transaction data from the in-flight internet service provider, based on the flight number and the flight destination, a white list entry associated with the cardholder's PAN and comprising a date of travel based on the transaction date and an anticipated travel location based on the flight destination;
    transmitting, with the network interface, data comprising the white list entry to a white list database;
    receiving, with the network interface, from a merchant bank network, a transaction request comprising an amount, a payment card PAN, a transaction request date, and a geographic location from which the transaction request originated;
    determining, with the processor, based on a plurality of entries in the white list database and the transaction request, that the payment card PAN matches the cardholder's PAN;
    determining, with the processor, based on the transaction request and the white list entry associated with the cardholder's PAN, that the anticipated travel location corresponds to the geographic location and the date of travel corresponds to the transaction request date;
    determining, with the processor, a fraud score associated with the transaction request, wherein a determination that the anticipated travel location corresponds to the geographic location and a determination that the date of travel corresponds to the transaction request date are factors in determining the fraud score; and
    transmitting, with the network interface, to an issuer associated with the payment card PAN, the transaction request and the fraud score, wherein the issuer subsequently determines, based at least on the fraud score, whether to authorize or to decline the transaction request.

2. The method of claim 1, further comprising:
    transmitting, with the network interface, to a travel database, the cardholder name associated with the cardholder, wherein the travel database, upon receipt of the cardholder name, determines whether any given travel itinerary stored therein is associated with the cardholder name; and
    receiving, with the network interface, from the travel database, a cardholder travel itinerary comprising the flight number associated with the cardholder and a date of travel associated with the cardholder.

3. The method of claim 2, wherein the cardholder travel itinerary further comprises a return date of travel associated with the cardholder.

4. The method of claim 3, wherein determining whether the date of travel corresponds to the transaction request date comprises determining whether the transaction request date is within a range of inclusive dates between the date of travel and the return date of travel associated with the cardholder.

5. The method of claim 4, wherein the anticipated travel location is one or more of a city, a metropolitan area, a county, a state, a province, or a country.

6. The method of claim 5, wherein the fraud score indicates the transaction request is likely fraudulent when either the anticipated travel location does not correspond to the geographic location or the date of travel does not correspond to the transaction request date.

7. The method of claim 6, further comprising:
    causing, with the processor, the transaction request to be declined when the fraud score is less than or equal to a threshold score, wherein the transaction request is declined prior to transmitting the transaction request and the fraud score to the issuer.

8. A system comprising:
    a network interface of a payment network configured to receive, from an in-flight internet service provider, payment transaction data associated with a purchase of internet service from an in-flight internet service provider, wherein the payment transaction data comprises a primary account number (PAN) associated with a cardholder, a name associated with the cardholder, a transaction date, and payment addenda;
    a processor and a memory comprising computer executable instructions, which when executed by the processor cause the processor to:
        determine a flight number based on the payment addenda and a flight destination based on the flight number, the transaction date, and an entry in a travel database associated with the flight number and the transaction date; and
        generate, in response to receiving the payment transaction data from the in-flight internet service provider, based on the flight number the and flight destination, a white list entry associated with the cardholder's PAN and comprising a date of travel and an anticipated travel location, wherein the date of travel is based on the transaction date and the anticipated travel location is based on the flight destination location;
a network interface of the payment network configured to:
transmit, data comprising the white list entry to a white list database; and
receive, from a merchant bank network, a transaction request comprising an amount, a payment card PAN, a transaction request date, and a geographic location from which the transaction request originated; and
the memory further comprising additional computer executable instructions, which when executed by the processor cause the processor to:
determine, based on a plurality of entries in the white list database and the transaction request, that the payment card PAN matches the cardholder's PAN;
determine, based on the transaction request and the white list entry associated with the cardholder's PAN, that the anticipated travel location corresponds to the geographic location and the date of travel corresponds to the transaction request date;
determine a fraud score associated with the transaction request, wherein a determination that the anticipated travel location corresponds to the geographic location and a determination that the date of travel corresponds to the transaction request date are factors in determining the fraud score; and
the network interface of the payment network further configured to:
transmit, to an issuer associated with the payment card PAN, the transaction request and the fraud score, wherein the issuer subsequently determines, based at least on the fraud score, whether to authorize or to decline the transaction request.

9. The system of claim 8, wherein the network interface of the payment network is further configured to:
transmit, to a travel database, the cardholder name associated with the cardholder, wherein the travel database, upon receipt of the cardholder name, determines whether any given travel itinerary stored therein is associated with the cardholder name; and
receive, from the travel database, a cardholder travel itinerary comprising the flight number associated with the cardholder and a date of travel associated with the cardholder.

10. The system of claim 9, wherein the cardholder travel itinerary further comprises a return date of travel associated with the cardholder.

11. The system of claim 10, wherein determining whether the date of travel corresponds to the transaction request date comprises determining whether the transaction request date is within a range of inclusive dates between the date of travel and the return date of travel associated with the cardholder.

12. The system of claim 11, wherein the anticipated travel location is one or more of a city, a metropolitan area, a county, a state, a province, or a country.

13. The system of claim 12, wherein the fraud score indicates the transaction request is likely fraudulent when either the anticipated travel location does not correspond to the geographic location or the date of travel does not correspond to the transaction request date.

14. The system of claim 13, wherein the memory further comprises additional computer executable instructions, which when executed by the processor cause the processor to:
cause the transaction request to be declined when the fraud score is less than or equal to a threshold score, wherein the transaction request is declined prior to transmitting the transaction request and the fraud score to the issuer.

15. A non-transitory computer-readable medium encoded with data and instructions, which when executed by a computing device of a payment network cause the computing device of the payment network to:
receive, with a network interface of the payment network, from an in-flight internet service provider, payment transaction data associated with a purchase of internet service from the in-flight internet service provider wherein the payment transaction data comprises a primary account number (PAN) associated with a cardholder, a name associated with the cardholder, a transaction date, and payment addenda;
determine, with a processor a flight number based on the payment addenda and a flight destination based on the flight number, the transaction date, and an entry in a travel database associated with the flight number and the transaction date;
generate, with the processor in response to receiving the payment transaction data from the in-flight internet service provider, based on the flight number and the flight destination, a white list entry associated with the cardholder's PAN and comprising a date of travel based on the transaction date and an anticipated travel location based on the flight destination;
transmit, with the network interface, data comprising the white list entry to a white list database;
receive, with the network interface, from a merchant bank network, a transaction request comprising an amount, a payment card PAN, a transaction request date, and a geographic location from which the transaction request originated;
determine, with the processor, based on a plurality of entries in the white list database and the transaction request, that the payment card PAN matches the cardholder's PAN;
determine, with the processor, based on the transaction request and the white list entry associated with the cardholder's PAN, that the anticipated travel location corresponds to the geographic location and the date of travel corresponds to the transaction request date;
determine, with the processor, a fraud score associated with the transaction request, wherein a determination that the anticipated travel location corresponds to the geographic location and a determination that the date of travel corresponds to the transaction request date are factors in determining the fraud score; and
transmit, with the network interface, to an issuer associated with the payment card PAN, the transaction request and the fraud score, wherein the issuer subsequently determines, based at least on the fraud score, whether to authorize or to decline the transaction request.

16. The non-transitory computer-readable medium of claim 15, wherein the instructions further cause the computing device to:
transmit, with the network interface, to a travel database, the cardholder name associated with the cardholder, wherein the travel database, upon receipt of the cardholder name, determines whether any given travel itinerary stored therein is associated with the cardholder name; and receive, with the network interface, from the travel database, a cardholder travel itinerary comprising the flight number associated with the cardholder and a date of travel associated with the cardholder.

17. The non-transitory computer-readable medium of claim 16, wherein the cardholder travel itinerary further comprises a return date of travel associated with the cardholder.

18. The non-transitory computer-readable medium of claim 17, wherein determining whether the date of travel corresponds to the transaction request date comprises determining whether the transaction request date is within a range of inclusive dates between the date of travel and the return date of travel associated with the cardholder.

19. The non-transitory computer-readable medium of claim 18, wherein the anticipated travel location is one or more of a city, a metropolitan area, a county, a state, a province, or a country.

20. The non-transitory computer-readable medium of claim 19, wherein the fraud score indicates the transaction request is likely fraudulent when either the anticipated travel location does not correspond to the geographic location or the date of travel does not correspond to the transaction request date.

\* \* \* \* \*